United States Patent
Seyedzadehdelcheh et al.

(10) Patent No.: US 11,740,791 B2
(45) Date of Patent: Aug. 29, 2023

(54) DATA COMPRESSION SYSTEM USING BASE VALUES AND METHODS THEREOF

(71) Applicant: ADVANCED MICRO DEVICES, INC., Santa Clara, CA (US)

(72) Inventors: Seyed Mohammad Seyedzadehdelcheh, Bellevue, WA (US); Xianwei Zhang, Austin, TX (US); Bradford Beckmann, Bellevue, WA (US); Shomit N. Das, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 30 days.

(21) Appl. No.: 17/497,286

(22) Filed: Oct. 8, 2021

(65) Prior Publication Data

US 2022/0083233 A1    Mar. 17, 2022

Related U.S. Application Data

(63) Continuation of application No. 16/724,609, filed on Dec. 23, 2019, now Pat. No. 11,144,208.

(51) Int. Cl.
*G06F 3/06* (2006.01)
*G06F 12/0875* (2016.01)
*G06T 1/20* (2006.01)

(52) U.S. Cl.
CPC ............ *G06F 3/0608* (2013.01); *G06F 3/064* (2013.01); *G06F 3/0659* (2013.01);
(Continued)

(58) Field of Classification Search
CPC ...... G06F 3/0608; G06F 3/064; G06F 3/0659; G06F 3/0673; G06F 12/0875; G06F 2212/1044; G06T 1/20
See application file for complete search history.

(56) References Cited

U.S. PATENT DOCUMENTS

| | | | | |
|---|---|---|---|---|
| 5,724,561 | A | * | 3/1998 | Tarolli ................. G06T 15/503 345/419 |
| 2009/0324109 | A1 | * | 12/2009 | Johnston ................ H04N 1/648 382/232 |

(Continued)

OTHER PUBLICATIONS

Chris Brennan, Getting the Most Out of Delta Color Compression, available at: https://gpuopen.com/learn/dcc-overview/ Mar. 2016 (Year: 2016).*

(Continued)

*Primary Examiner* — Ryan Bertram

(57) ABSTRACT

In some embodiments, a memory controller in a processor includes a base value cache, a compressor, and a metadata cache. The compressor is coupled to the base value cache and the metadata cache. The compressor compresses a data block using at least a base value and delta values. The compressor determines whether the size of the data block exceeds a data block threshold value. Based on the determination of whether the size of the compressed data block generated by the compressor exceeds the data block threshold value, the memory controller transfers only a set of the compressed delta values to memory for storage. A decompressor located in the lower level cache of the processor decompresses the compressed data block using the base value stored in the base value cache, metadata stored in the metadata cache and the delta values stored in memory.

20 Claims, 5 Drawing Sheets

(52) U.S. Cl.
CPC ........ *G06F 3/0673* (2013.01); *G06F 12/0875* (2013.01); *G06F 2212/1044* (2013.01); *G06T 1/20* (2013.01)

(56) References Cited

U.S. PATENT DOCUMENTS

| | | | | |
|---|---|---|---|---|
| 2012/0213435 | A1* | 8/2012 | Donovan | H04N 19/186 |
| | | | | 382/166 |
| 2016/0328154 | A1* | 11/2016 | Mizushima | G06F 3/0679 |
| 2016/0353122 | A1* | 12/2016 | Krajcevski | H04N 19/46 |
| 2018/0082408 | A1* | 3/2018 | Dewhurst | G06T 5/50 |
| 2018/0330239 | A1* | 11/2018 | Chen | G06N 3/00 |
| 2021/0288659 | A1* | 9/2021 | Ghasemazar | G06F 12/0886 |
| 2022/0035546 | A1* | 2/2022 | Park | G06F 3/0679 |

OTHER PUBLICATIONS

Gennady Pekhimenko et al, Base-Delta-lmmediate Compression: Practical Data Compression for On-Chip Caches, Carnegie Mellon University, Sep. 2012 (Year: 2012).*

* cited by examiner

DATA COMPRESSION SYSTEM USING BASE VALUES AND METHODS THEREOF

CROSS-REFERENCE TO RELATED APPLICATIONS

The present application is a Continuation application of U.S. patent application Ser. No. 16/724,609, entitled "DATA COMPRESSION SYSTEM USING BASE VALUES AND METHODS THEREOF", and filed on Dec. 23, 2019, the entirety of which is incorporated by reference herein.

GOVERNMENT LICENSE RIGHTS

This invention was made with Government support under the PathForward Project with Lawrence Livermore National Security (Prime Contract No. DE-AC52-07NA27344, Subcontract No. B620717) awarded by DOE. The Government has certain rights in this invention.

BACKGROUND

Computing devices, such as, graphical processing units (GPUs), use various data compression techniques to increase the amount of available memory bandwidth. For example, in some devices image data is compressed before or during transfer between different levels of a memory hierarchy associated with a GPU, such as between a cache and system memory. Successive generations of GPUs have attempted to improve the quality of rendered images by utilizing different compression methods that support higher pixel resolutions, greater color depths, and higher frame rates. However, current data compression techniques often do not adequately compress the data being processed by the computing device, resulting in an inefficient use of local memory. Reducing the amount of data transferred over long distances in a processing system can improve storage use and provide significant energy savings and performance benefits to the processing system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

As described herein, the memory bandwidth consumed when transferring video/graphics images (or other bit streams) between memory modules is reduced by implementing a compressor in a memory controller of a graphical processing unit (GPU), wherein the compressor uses base values and delta values to generate a compressed data block. The base values represent colors of pixels in a block based on a color of a reference pixel and the delta values represent differences between the colors of the other pixels and the color of the reference pixel. The compressor determines whether the size of the compressed data block exceeds a data block threshold value that is indicative of a bus interface width. If the size of the compressed data block exceeds the threshold, the memory controller transfers only the compressed delta values to local memory for storage. The base value is removed from the compressed data block and stored in a base value cache that is located in the memory controller. By limiting the compressed data that is transferred from, for example, a central processing unit (CPU) to GPU memory to only the delta values of the compressed data block (rather than both the base value and the delta values), storage normally utilized for base values in GPU memory is available for additional compressed data.

Figure 1:
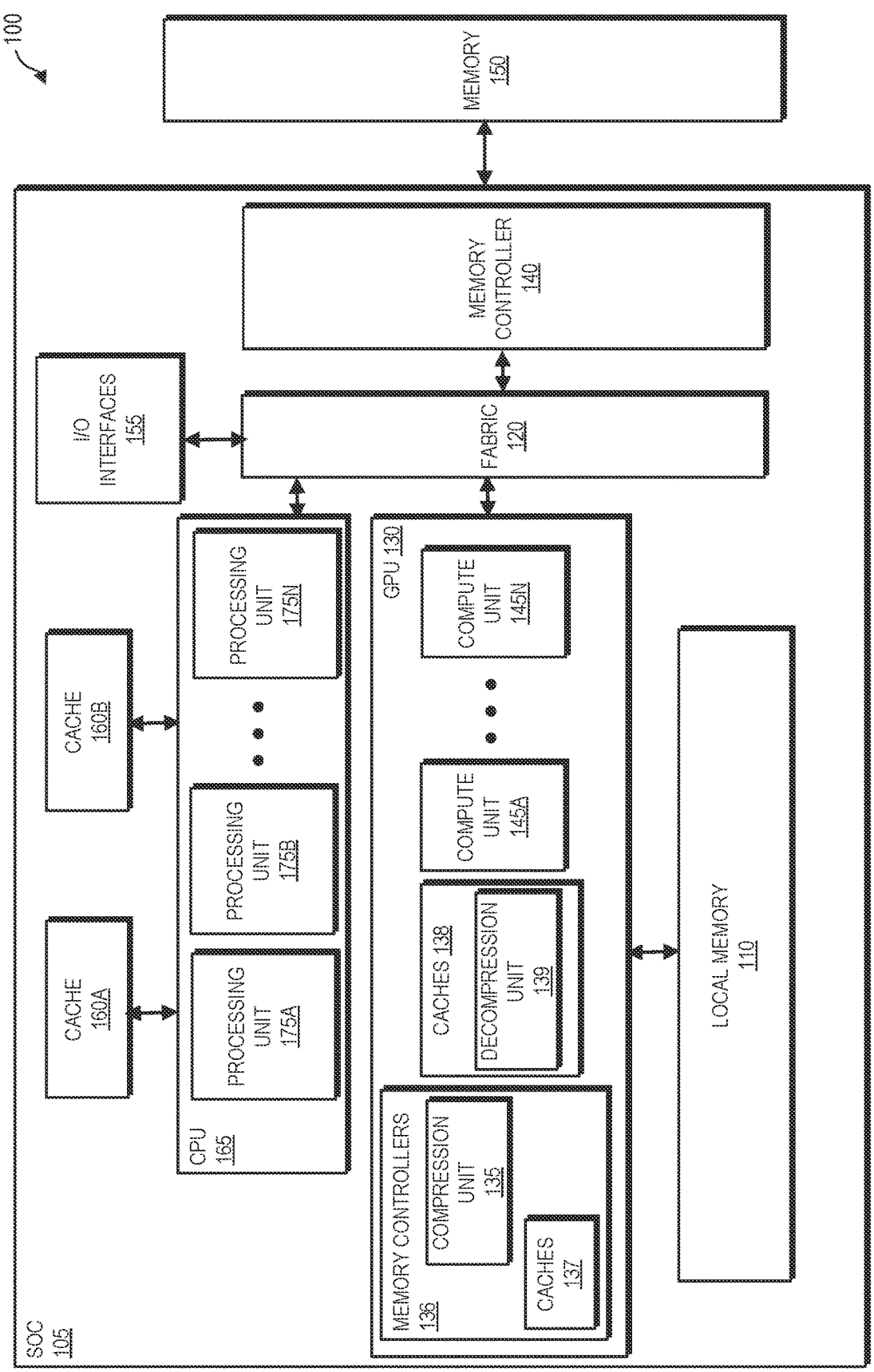
FIG. 1 is a block diagram of a processing system implementing data compression and decompression for transferring data between memory modules in accordance with some embodiments.

FIG. 1 illustrates a block diagram of a processing system 100 in accordance with some embodiments. In some embodiments, processing system 100 includes system on chip (SoC) 105 coupled to memory 150. SoC 105 can also be referred to as an integrated circuit (IC). In one embodiment, SoC 105 includes processing units 175A-N of central processing unit (CPU) 165, input/output (I/O) interfaces 155, caches 160A-B, fabric 120, graphics processing unit (GPU) 130, local memory 110, and memory controller(s) 140. In some embodiments, SoC 105 includes other components not shown in FIG. 1 to avoid obscuring the figure. Processing units 175A-N are representative of any number and type of processing units. In one embodiment, processing units 175A-N are CPU cores. In another embodiment, one or more of processing units 175A-N are other types of processing units (e.g., application specific integrated circuit (ASIC), field programmable gate array (FPGA), digital signal processor (DSP) units, and the like). Processing units 175A-N of CPU 165 are coupled to caches 160A-B and fabric 120.

In one embodiment, processing units 175A-N are configured to execute instructions of a particular instruction set architecture (ISA). Each processing unit 175A-N includes one or more execution units, cache memories, schedulers, branch prediction circuits, and so forth. In one embodiment, the processing units 175A-N are configured to execute the main control software of processing system 100, such as an operating system. Generally, software executed by processing units 175A-N during use can control the other components of processing system 100 to realize the desired functionality of processing system 100. Processing units 175A-N can also execute other software, such as application programs.

GPU 130 includes at least memory controller 136, cache(s) 138, and compute units 145A-N. It is noted that compression unit 135 is also sometimes referred to as a "compression module" or a "compressor module". Memory controller 136 includes a compression unit 135 configured to compress a cache line or data block according to various compression techniques (described further below with reference to FIGS. 1-5). Compute units 145A-N are representative of any number and type of compute units that are used for graphics or general-purpose processing. Each compute unit 145A-N includes any number of execution units, with the number of execution units per compute unit varying from embodiment to embodiment. GPU 130 is coupled to local memory 110 and fabric 120. In one embodiment, local memory 110 is implemented using high-bandwidth memory (HBM). In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

I/O interfaces 155 are coupled to fabric 120, and I/O interfaces 155 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 155. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. In different embodiments, the RAM implemented is static RAM (SRAM), dynamic RAM (DRAM), Resistive RAM (ReRAM), Phase Change RAM (PCRAM), or any other volatile or non-volatile RAM, or a combination thereof. The type of DRAM that is used to implement memory 150 includes (but is not limited to) double data rate (DDR) DRAM, DDR2 DRAM, DDR3 DRAM, and the like. Although not explicitly shown in FIG. 1, in some embodiments SoC 105 includes one or more cache memories that are internal to the processing units 175A-N and/or compute units 145A-N. In some embodiments, SoC 105 includes caches 160A-B that are utilized by processing units 175A-N. In one embodiment, caches 160A-B are part of a cache subsystem including a cache controller.

It is noted that the letter "N" when displayed herein next to various structures is meant to generically indicate any number of elements for that structure (e.g., any number of processing units 175A-N in CPU 165, including one processing unit). Additionally, different references within FIG. 1 that use the letter "N" (e.g., compute units 145A-N) are not intended to indicate that equal numbers of the different elements are provided (e.g., the number of processing units 175A-N in CPU 165 can differ from the number of compute units 145A-N of GPU 130).

In some embodiments, processing system 100 is a computer, laptop, mobile device, server or any of various other types of processing systems or devices. It is noted that the number of components of processing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that in some embodiments processing system 100 and/or SoC 105 includes other components not shown in FIG. 1. Additionally, in other embodiments, processing system 100 and SoC 105 is structured in other ways than shown in FIG. 1.

In some embodiments, memory controller 136 of GPU 130 performs compression operations during read and write requests from CPU 165. In some embodiments, compression occurs upon receipt of an uncompressed bitstream from CPU 165 by memory controller 136. In some embodiments, compression occurs at any time during the transfer of an uncompressed bitstream by GPU 130, such as from the GPU 130 to the CPU 165 or to the memory 150. The bitstream includes one or more data blocks wherein, in some embodiments, the data block is a sequence of bytes or bits. In other embodiments, the data block is a cache line, a plurality of cache lines, or a portion of a cache line. In different embodiments, each read or write request associated with a memory transfer corresponds to a single data block or a plurality of data blocks. That is, in some embodiments a read or write request retrieves or stores multiple blocks of data.

To compress data, compression unit 135 receives an uncompressed bitstream (e.g., cache line or other data block) and compresses the uncompressed bitstream using, for example, delta color compression. Delta color compression is a lossless form of compression performed by compression unit 135 that divides the uncompressed bitstream into a plurality of data blocks where a single pixel in each data block is written using a normal representation of the pixel in the data block (a base value). The remaining pixels in the data block are encoded as a difference from the base value (delta values). Thus, the output of delta color compression is a compressed data block that includes at least a base value and delta values. The delta values are stored at a lower precision than the original pixels, requiring fewer bits of data to represent each pixel, and thereby reducing the overall of the data used to represent a given data block. In some embodiments, other types of compression techniques are used by the compression unit 135 for compression, such as, for example, base-delta-immediate (BDI) compression, that also generate base values and delta values during compression.

Compression unit 135 generates the compressed data block and, after determining the size of the compressed data block, compares the size of the compressed data block to a data block threshold value. The data block threshold value is a predefined data packet size that is dependent upon the bus interface width. In some embodiments, for example, a 128-bit high bandwidth memory bus interface that connects local memory 110 and GPU 130 transports 32-byte data packets (that is, over a 128 bus), resulting in a data block threshold value of 32. That is, in some embodiments, a 128-bit (16-bytes) bus interface divides a 32-byte packet into two 16-byte blocks and transfers them in one cycle via the falling edge and the rising edge of the clock signal. In other embodiments, the data block threshold value is 64, 128, or another size that is dependent on the bus interface width.

In some embodiments, when compression unit 135 determines that the size of the compressed data block is equal to or less than the data block threshold value, the compression unit 135 provides the compressed data block, including the delta values and the base value, to local memory 110 for storage. In some embodiments, when compression unit 135 determines that the size of the compressed data block exceeds the data block threshold value, the compression unit 135 removes or decouples the base value/s from the compressed data block and stores the base value/s in a base value look-up table in a base value cache. The base value cache (described further in detail with reference to FIG. 2) is a cache located in caches 137 of the memory controller 136 that stores the base values for data blocks whose size exceeds the data block threshold value. The compressed delta value data block, i.e., the compressed data block including only the delta values of the data block, is output by the compression unit 135 for storage into local memory 110 (i.e., transfer between cache 138 and local memory 110).

Figure 2:
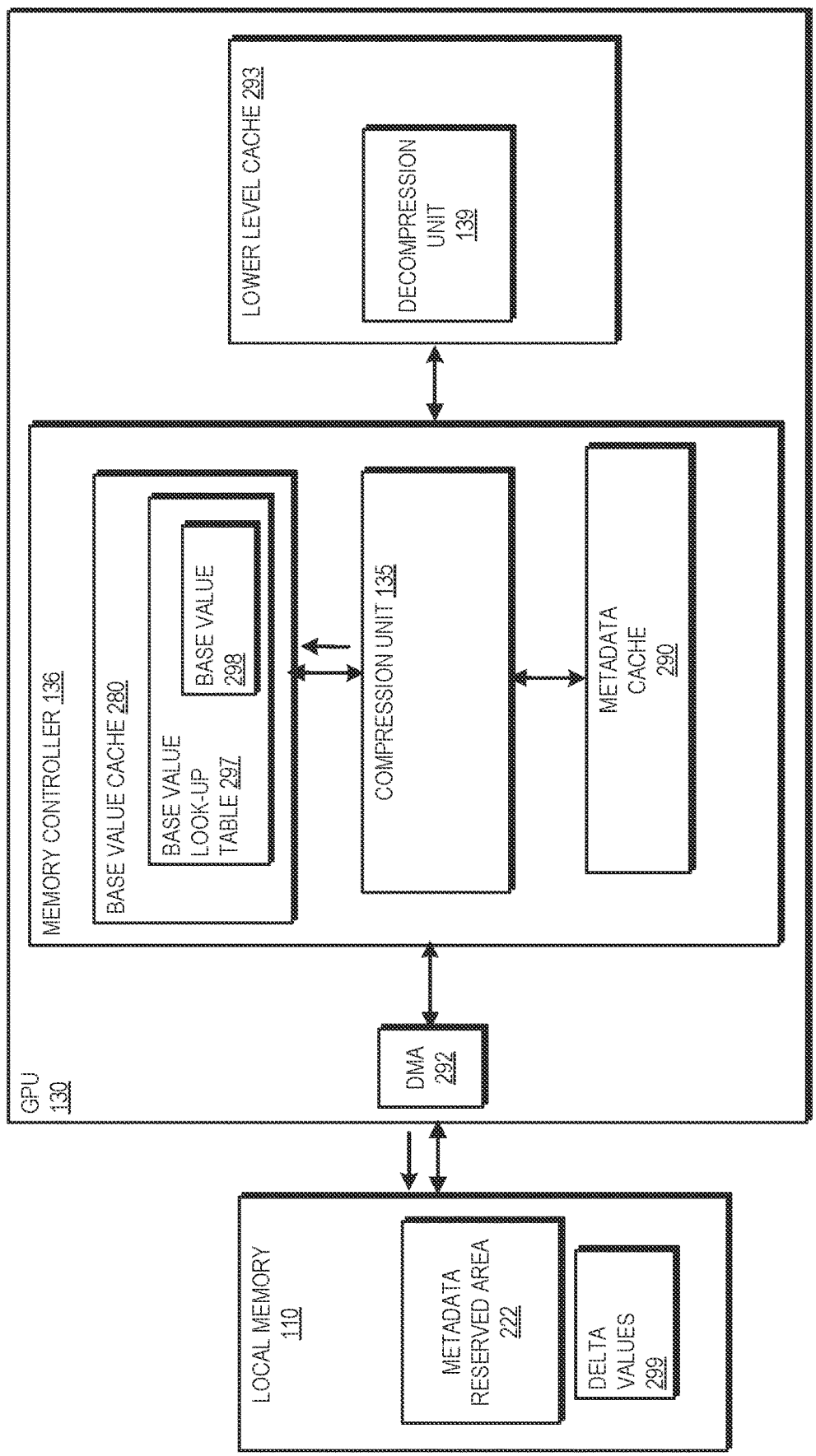
FIG. 2 is a block diagram of a portion of the processing system of FIG. 1 implementing data compression and decompression in accordance with some embodiments.

In order to regenerate the original data block, which occurs during, for example, a read operation requiring the uncompressed data block, decompression unit 139 annexes the base values that are stored in the base value cache to the compressed delta values that are stored in local memory 110 during the decompression process. By storing the base values in the base value cache such that the compression unit 135 transfers only the delta value data block between cache 138 and local memory 110, compression unit 135 increases data throughput by utilizing the bandwidth that would normally be used for transmission of the base values for additional compressed data blocks. FIG. 2 (described in detail below) illustrates an example showing a base value 298 being stored at the base value cache 280 and the delta values 299 being transferred and stored to local memory 110.

FIG. 2 is a block diagram illustrating a portion of GPU 130 and local memory 110 according to some embodiments. GPU 130 includes memory controller 136, direct memory access (DMA) 292, and lower level cache 293. DMA 292 is configured to perform typical DMA operations for GPU 130, Memory controller 136 includes compression unit 135, base value cache 280, and metadata cache 290. Lower level cache 293 includes decompression unit 139. Compression unit 135 is a compressor configured to compress a cache line, data block, pixel data, or other form of data using, for example, delta color compression. Base value cache 280 is a cache configured to store base values for data blocks whose size exceeds the data block threshold value. Metadata cache 290 is a cache configured to store metadata associated with the compressed data block output generated by compression unit 135 (described further in detail below with respect to FIGS. 2-5).

In operation, DMA 292 receives a memory access request (write request or read request) for access to data associated with lower level cache 293 or local memory 110. For a write request, compression unit 135 receives a cache line (e.g., pixel data) that is to be compressed and written to lower level cache 293 or local memory 110. Compression unit 135 divides the cache line into a fixed number of data blocks dependent on the size of the cache line. For example, in some embodiments, compression unit 135 receives a 128-byte cache line and divides the cache line into two 64-byte data blocks, data block 1 and data block 2.

In some embodiments, compression unit 135 selects a reference pixel based on, for example, the data coherence or similarities of the color of the selected pixel to the surrounding pixels, from among the pixels in the data block and determines a base value for the reference pixel. For example, in some embodiments, the base value is a color value for the reference pixel that can be represented by values of eight bits if an 8-bit color depth (or color gamut) is used to represent the colors of the pixels. In some variations, the compression unit 135 selects more than one pixel as a potential reference pixel and then selects a single pixel based on, for example, the similarities or data coherence of the surrounding pixels, from the potential reference pixels to use as a base value. Information identifying the base value is included in a corresponding base value cache entry index that is used to define the location of the base value in the base value cache (described further in detail below with reference to FIG. 3A).

Compression unit 135 then defines delta values that represent a difference between the color value of the reference pixel and color values of the other pixels in the block. In some embodiments, the delta values for the pixels can be positive or negative depending on the relative values of the color of the reference pixel and the color of the pixel. The number of pixels that is sufficient to represent the delta values depends on the range of possible delta values of the pixels in the block. For example, in some embodiments, if the pixels are represented by an 8-bit color depth, the delta values of the pixels are in the range −255 to +255. For example, eight bits are sufficient to represent the absolute value of the delta values, which ranges from 0 to 255, and one additional bit is needed to represent the sign of the delta values. In some embodiments, inside a compressed data block, only a single value is stored with full precision, and the remaining values are stored as a deltas, i.e., delta values. If the colors are similar (i.e., there is data coherence), the delta values use fewer bits relative to the uncompressed input and thus using DCC saves space in local memory 110 compared to pixel values that have not been compressed.

In addition to compression unit 135 generating a base value and the associated delta values, compression unit 135 generates metadata (depicted below with reference to FIG. 3A) that includes information identifying the size of the compressed data block (i.e., a compression auxiliary bit) and the location of each base value (base value cache entry index) in the base value cache 280. Compression unit 135 provides the metadata information to metadata cache 290 or metadata reserved area 220 for use by decompression unit 139 during decompression of the compressed data block.

Figure 3A:
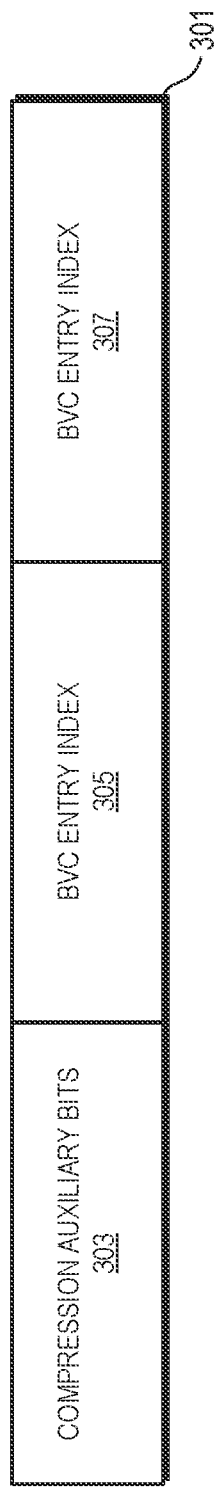
FIG. 3A illustrates a metadata field used for compressing and decompressing data for transfer between memory modules of a processing system in accordance with some embodiments.

FIG. 3A illustrates a metadata field used in the processing system of FIGS. 1-2 in accordance with some embodiments. Metadata field includes the compression auxiliary bit and the base value cache entry indexes for each compressed data block that are stored in compression auxiliary bit field 303, base value cache entry index field 305, and base value cache entry index field 307. In some embodiments, for example, compression unit 135 determines that the size of compressed block is 32 or 36 and provides the size metadata information to compression auxiliary bit field of metadata cache 290. In some embodiments, for example, compression unit 135 stores a base value in a base value cache look-up table at a base value cache location of, for example, a location index value, and stores the location at base value cache entry index field 305.

Referring back to FIG. 2, in some embodiments, compression unit 135 compares the size of the compressed data block to the data block threshold value (described previously with reference to FIG. 1). In some embodiments, when compression unit 135 determines that the size of the compressed data block stored in compression auxiliary bit field 303 is equal to or does not exceed the data block threshold value, the compression unit 135 does not update the base value cache 280 (i.e., provide the base value to the base value look-up table 297 in base value cache 280) and provides the compressed data block, including the delta values and the base value, to local memory 110 or lower level cache 293 for storage.

In some embodiments, when compression unit 135 determines that the size of the compressed data block exceeds the data block threshold value, the compression unit 135 updates the base value cache 280 with the base value. That is, compression unit 135 removes the base value from the compressed data block and stores the base values in the base value look-up table 297 in base value cache 280. The compressed delta value data block, i.e., the compressed data block including only the delta values of the data block, is provided by compression unit 135 to local memory 110 for storage.

For a read request, memory controller 136 determines whether the requested data block is in lower level cache 293. When the requested data block is located in the lower level cache 293 (a hit), memory controller 136 determines whether the metadata associated with the requested data block is in the metadata cache 290 (metadata field 301 of in FIG. 3A) or in metadata reserved area 222 of local memory 110. When the metadata associated with the requested data block is in metadata cache 290, decompression unit 139 retrieves the associated base values from the base value look-up table 297 of base value cache 280 and adds the metadata to the base value. Decompression unit 139 uses the metadata, the base value and the compressed delta values, to generate the uncompressed cache line that is provided to, for example, the CPU 165 from the lower level cache 293.

During a lower level cache 293 read miss, i.e., when the requested data block is not available in lower level cache 293, memory controller 136 fetches the compressed data block by sending a request to local memory 110 for the compressed data block. Memory controller 136 determines whether the metadata associated with the requested data block is located in the metadata cache 290. When the metadata associated with the requested data block is located in metadata cache 290, memory controller 136 retrieves the base values associated with the requested data block from base value cache 280 and provides the metadata and the base values to decompression unit 139 to generate the uncompressed cache line. When the metadata associated with the requested data block is not located in metadata cache 290, memory controller 136 fetches the metadata from metadata reserved area 222. Memory controller 136 stores the fetched metadata in metadata cache 290. Memory controller 136 retrieves the base values associated with the requested data block from base value cache 280 and provides the metadata and the base values to decompression unit 139 to generate the uncompressed cache line. For a write miss, memory controller 136 writes only the compressed data block to the lower level cache 293. Because base values repeats across a data block and there a plurality of data blocks that are compressed for an image or sequence of images, by locating the base value/s 298 in the base value cache 280, a significant amount of space is saved in the local memory 110.

Figure 3B:
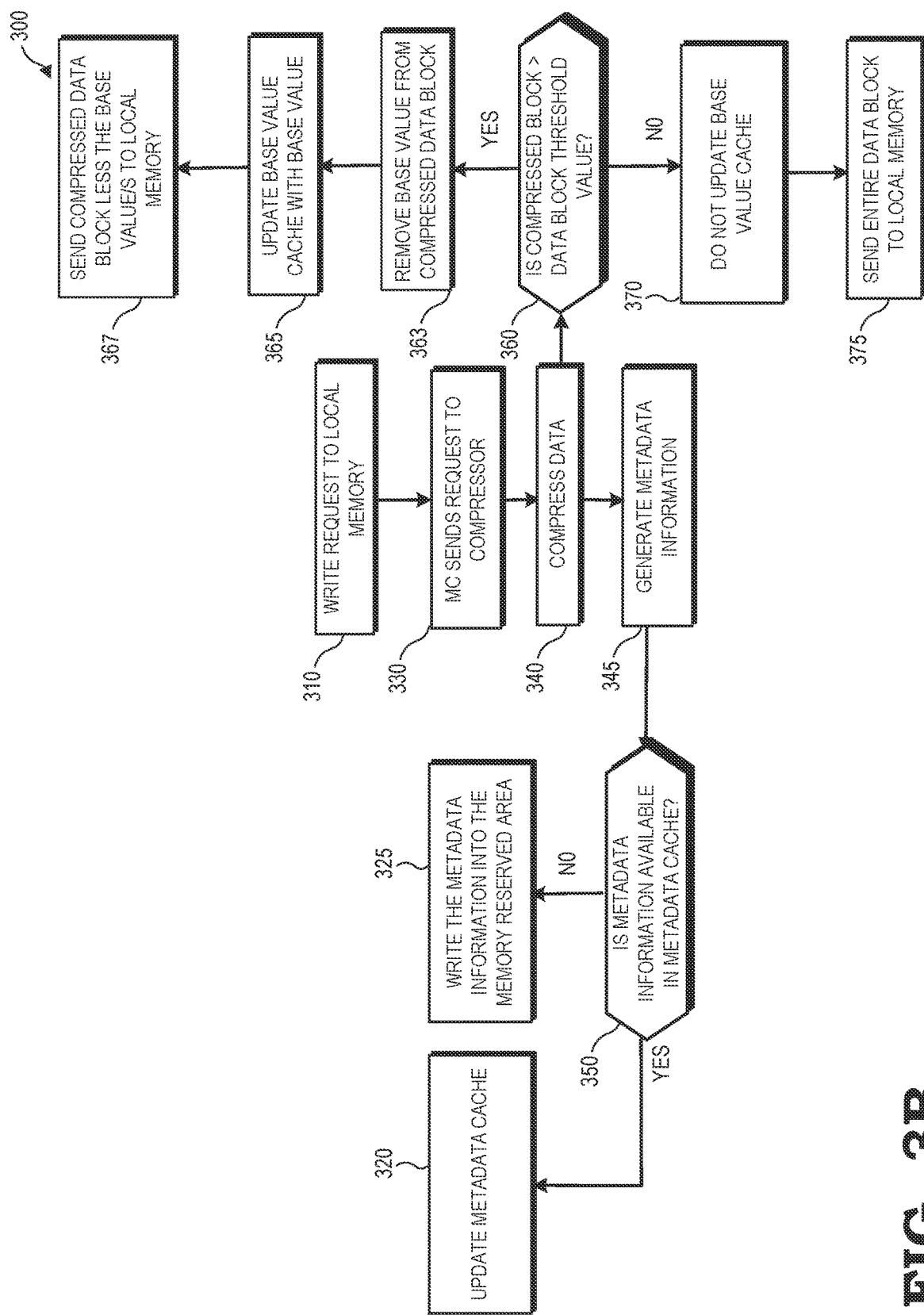
FIG. 3B illustrates a flow diagram illustrating a method for compressing data for transfer between memory modules of a processing system in accordance with some embodiments.

FIG. 3B illustrates a method 300 of compressing data in accordance with some embodiments. At block 310, memory controller 136 receives a write request from, for example, CPU 165, to local memory 110. At block 330, memory controller 136 sends a request to compress a data block to compression unit 135. At block 340, compression unit 135 compresses the data block. In some embodiments, as stated previously, compression unit 135 utilizes DCC compression or BDI compression to compress the received data block.

At block 345, compression unit 135 generates metadata that is associated with compressed data block. The metadata includes compression auxiliary bits and associated base value cache entries. At block 350, based on, for example, the size limitations of metadata cache 290, compression unit 135 determines if metadata can be stored in metadata cache 290. At block 320, when metadata can be stored in metadata cache 290, compression unit 135 updates metadata cache 290 with the metadata. At block 325, when metadata cannot be stored in metadata cache 290, due to, for example, metadata cache being full, memory controller 136 writes the metadata to the metadata reserved area 222. For example, as depicted in FIG. 3A, the metadata in metadata field 301 includes, for example, compression auxiliary bits stored compression auxiliary bit field 303, a base value cache entry index stored in base value cache entry index field 305, and a base value cache entry index stored in base value cache entry index field 305. In some embodiments, metadata field 301 is located in metadata reserved area 222 and metadata cache 290. Thus, each field (compression auxiliary bit field 303, base value cache entry index field 305, and base value cache entry index field 307) of metadata field 301 is accessible in either metadata cache 290, or metadata reserved area 222.

Referring back to block 340, at block 360 compression unit 135 determines whether the size of the compressed block is exceeds the data block threshold value which, in some embodiments, is stored in compression auxiliary bit field 303. At block 370, when the size of the compressed block does not exceed the data block threshold value, compression unit 135 does not update the base value cache 280. At block 375, the entire compressed data block is sent to local memory 110.

At block 363, when the size of the compressed block is exceeds the data block threshold value, compression unit 135 removes the base value from the compressed data block. At block 365, compression unit 135 updates the base value look-up table 297 in the base value cache 280 with the base value that has been removed from the compressed data block. At block 367, the compressed data block (less the base value) is sent to local memory 110 for storage.

Figure 4:
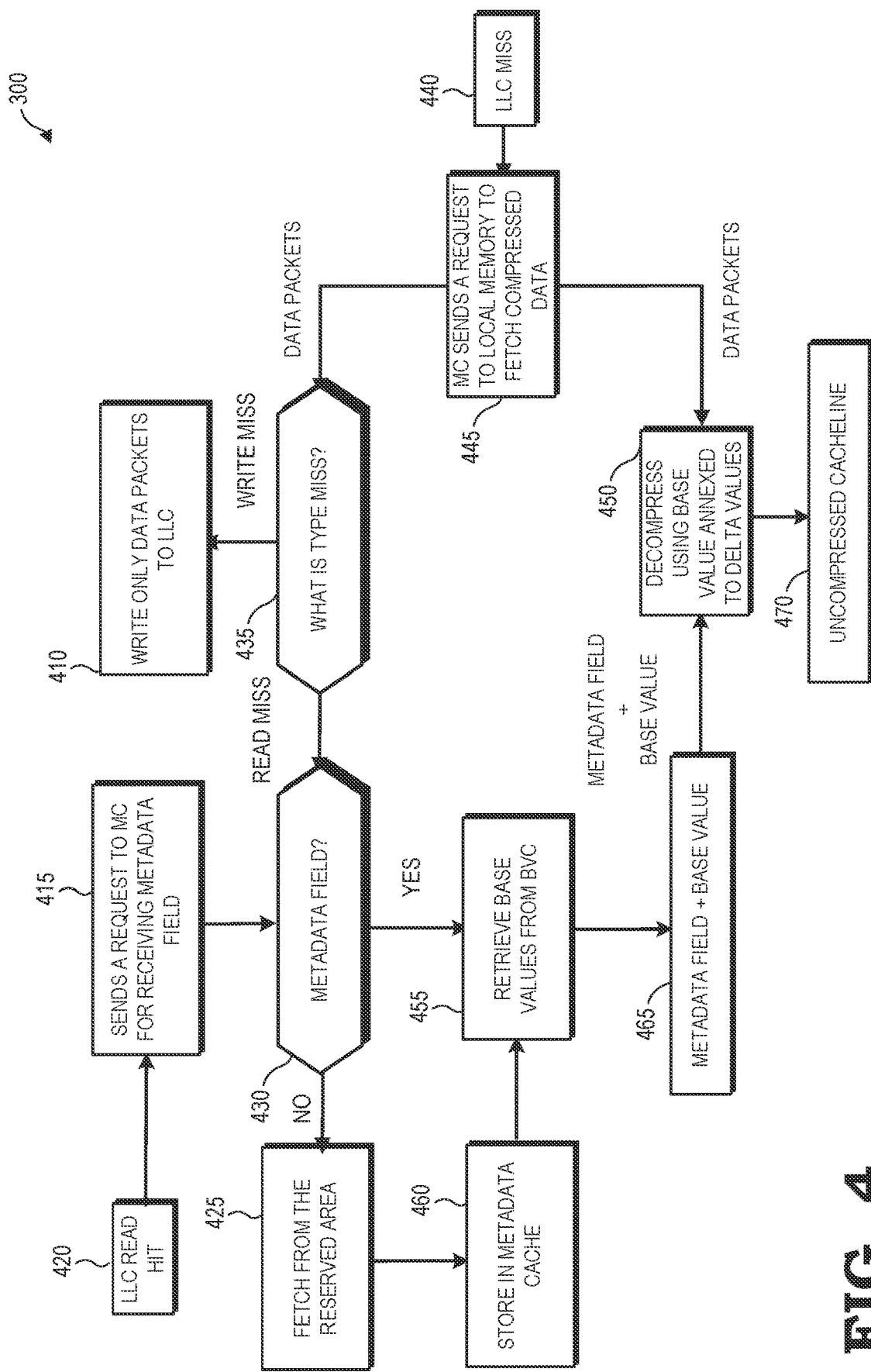
FIG. 4 illustrates a flow diagram illustrating a method for decompressing data transferred between memory modules of a processing system in accordance with some embodiments.

FIG. 4 illustrates a method 400 of decompressing data in accordance with some embodiments. At block 420, in response to a read request from, for example, CPU 165 or GPU 130, memory controller 136 determines that a read hit has occurred (i.e., the requested compressed data block is located in the lower level cache 293 resulting in a read hit). At block 415, as a result of the read hit, a metadata request is sent to memory controller 136 in order to retrieve metadata either from metadata reserved area 222 or metadata cache 290. At block 430, memory controller 136 determines whether to retrieve metadata from metadata reserved area 222 or metadata cache 290, i.e., memory controller 136 determines whether the metadata is located in the metadata field 301 of metadata cache 290.

Referring now to block 440, at block 440, memory controller 136 determines that a lower level cache 293 miss has occurred. At block 445, memory controller 136 sends a request to local memory 110 to fetch compressed data block from local memory 110. At block 435, memory controller 136 determines the type of miss. At block 410, when memory controller 136 determines the type of miss is a write miss, memory controller 136 writes only the data block to the lower level cache 293.

Referring back to block 430, when memory controller 136 determines the type of miss is a read miss at block 435 or a metadata request is sent to memory controller 136 at block 415, memory controller 136 determines whether the metadata is located in the metadata field 301 of metadata cache 290.

At block 425, when the metadata is not located in the metadata field 301 of the metadata cache 290, memory controller 136 fetches the metadata from the metadata reserved area 222 of local memory 110. At block 460, memory controller 136 stores the fetched metadata in metadata cache 290. At block 455, when memory controller 136 determines that the metadata is located in the metadata field 301 of the metadata cache 290 or memory controller 136 has stored the fetched metadata in metadata cache 290, memory controller 136 retrieves the base values associated with the read request from the base valued look-up table of the base value cache 280. At block 465, the metadata in the metadata field 301 is added to the base value associated with the read request and provided to decompression unit 139. At block 450, using the metadata, base value, and the compressed data block provided by local memory 110, decompression unit 139 of lower level cache 293 decompresses the compressed data block. At block 470, the uncompressed data block is provided as output to the decompression unit 139 for further processing by processing system 100.

In some embodiments, the apparatus and techniques described above are implemented in a system including one or more integrated circuit (IC) devices (also referred to as integrated circuit packages or microchips), such as the SoC described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the processing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the processing system (e.g., system RAM or ROM), fixedly attached to the processing system (e.g., a magnetic hard drive removably attached to the processing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in a processing system, identifying a compressed data block for decompression;
   in response to metadata associated with the compressed data block not being located in a metadata cache, retrieving the metadata from a memory and storing the metadata retrieved from the memory in the metadata cache;
   annexing at least a first base value associated with the compressed data block to a plurality of delta values associated with the compressed data block and stored in the memory; and
   decompressing the compressed data block according to the metadata, the first base value, and the plurality of delta values.

2. The method of claim 1, further comprising:
   receiving a read request for a cache identifying the compressed data block; and
   in response to receiving the read request for the cache, determining a read hit has occurred based on the read request.

3. The method of claim 2, further comprising:
   in response to determining the read hit has occurred, generating a metadata request for the metadata associated with the compressed data block.

4. The method of claim 1, further comprising:
receiving a read request for a cache identifying the compressed data block; and
in response to receiving the read request for the cache, determining a cache miss has occurred based upon the read request.

5. The method of claim 4, further comprising:
in response to determining the cache miss has occurred, generating a request to fetch the compressed data block from the memory.

6. The method of claim 4, further comprising:
in response to determining the cache miss has occurred, determining that the cache miss is one of a write miss or read miss.

7. The method of claim 6, further comprising:
in response to determining the cache miss is a write miss, writing only the compressed data block to the cache.

8. The method of claim 1, wherein the metadata includes a compression auxiliary bit indicative of a size of the compressed data block.

9. The method of claim 1, wherein the metadata includes at least a base value entry index indicative of a location of the first base value stored in a base value cache.

10. The method of claim 1, wherein the plurality of delta values is indicative of differences between a color value associated with the first base value and a plurality of color values associated with a plurality of pixels associated with the compressed data block.

11. An apparatus comprising:
a base value cache configured to store at least a first base value;
a metadata cache;
and a decompression unit coupled to the metadata cache and configured to:
identify a compressed data block for decompression;
in response to metadata associated with the compressed data block not being located in a metadata cache, retrieve the metadata from a memory and store the metadata from the memory in the metadata cache;
annex at least the first base value to a plurality of delta values associated with the compressed data block and stored in the memory; and
decompress the compressed data block according to the metadata, the first base value, and the plurality of delta values.

12. The apparatus of claim 11, wherein the decompression unit is further configured to:
receive a read request for a cache identifying the compressed data block; and
in response to receiving the read request for the cache, determine a read hit has occurred based upon the read request.

13. The apparatus of claim 12, wherein the decompression unit is further configured to:
in response to determining the read hit has occurred, generate a metadata request for the metadata associated with the compressed data block.

14. The apparatus of claim 11, wherein the decompression unit is further configured to:
receive a read request for a cache identifying the compressed data block; and
in response to receiving the read request for the cache, determine a cache miss has occurred based upon the read request.

15. The apparatus of claim 14, wherein the decompression unit is further configured to:
in response to determining the cache miss has occurred, generate a request to fetch the compressed data block from the memory.

16. The apparatus of claim 14, wherein the decompression unit is further configured to:
in response to determining the cache miss has occurred, determine the cache miss is one of a write miss or read miss.

17. The apparatus of claim 16, wherein the decompression unit is further configured to:
in response to determining the cache miss is a write miss, write only the compressed data block to the cache.

18. The apparatus of claim 11, wherein the metadata includes a compression auxiliary bit indicative of a size of the compressed data block.

19. A method comprising:
receiving a read request identifying a compressed data block to be decompressed;
in response to receiving the read request, retrieving metadata associated with the compressed data block and at least a first base value associated with the compressed data block;
annexing the first base value to a plurality of delta values associated with the compressed data block; and
decompressing the compressed data block according to the first base value annexed to the plurality of delta values and the metadata.

20. The method of claim 19, wherein the plurality of delta values is indicative of differences between a color value associated with the first base value and a plurality of color values associated with a plurality of pixels associated with the compressed data block.

* * * * *